C. B. SCHOENMEHL AND M. L. MARTUS.
PRIMARY BATTERY.
APPLICATION FILED MAR. 16, 1917. RENEWED OCT. 24, 1919.
1,325,115.
Patented Dec. 16, 1919.
2 SHEETS—SHEET 2.
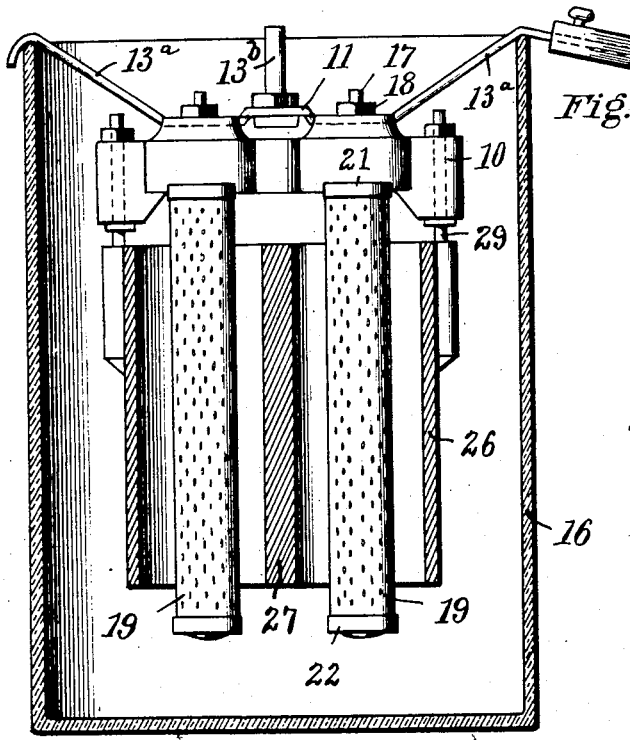
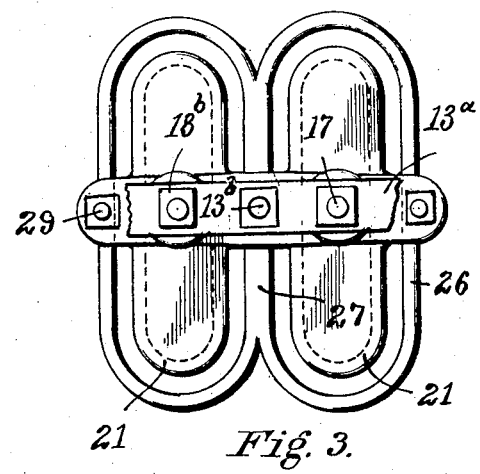
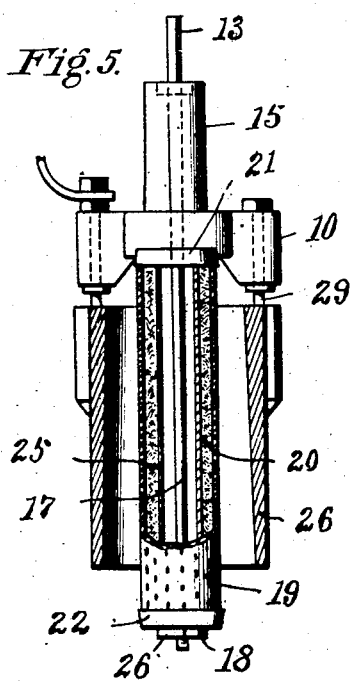
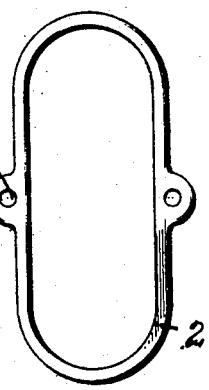
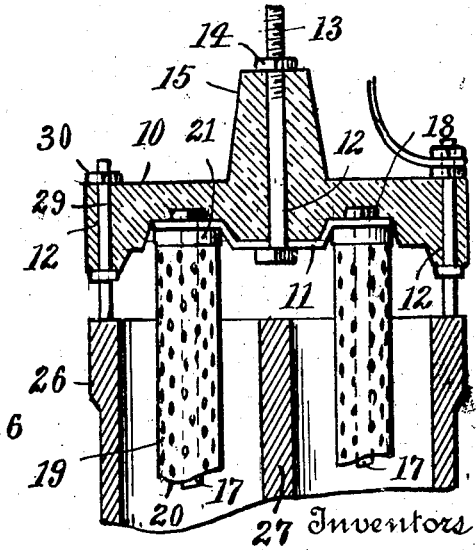
Inventors
Charles B. Schoenmehl and
Martin L. Martus
By Chamberlain & Newman Attorneys
Witnesses
Ruth M. W. Koger

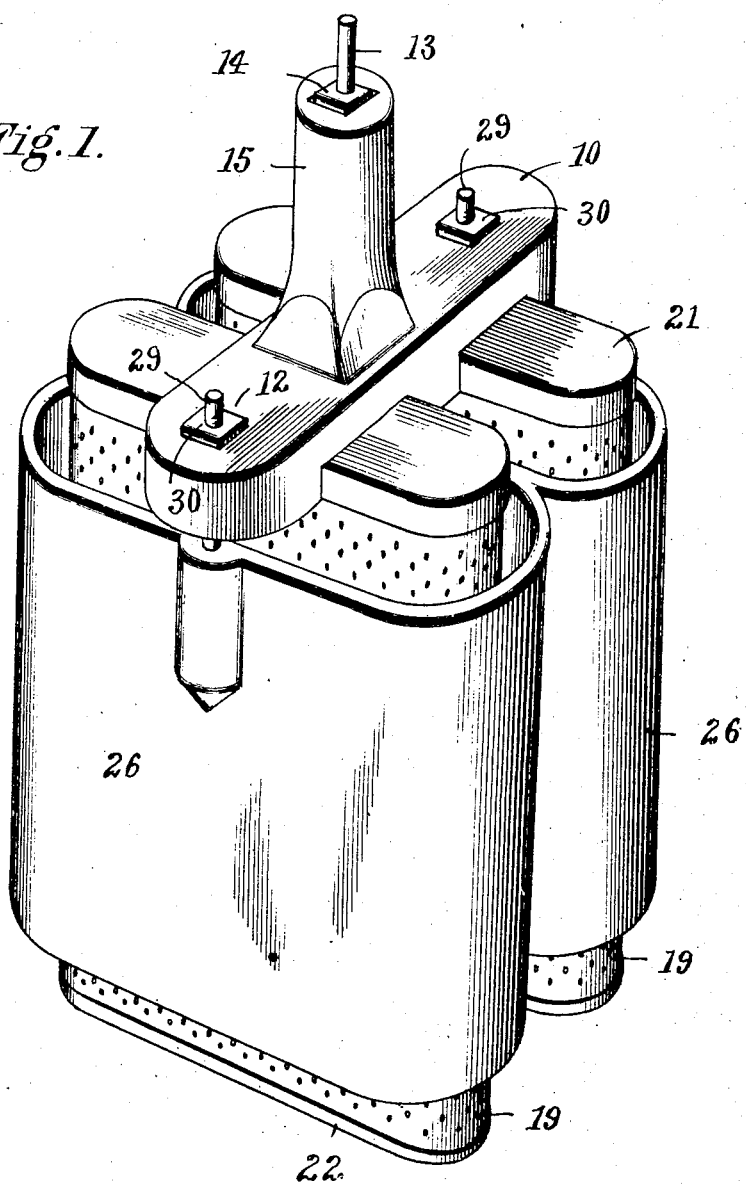

UNITED STATES PATENT OFFICE.

CHARLES B. SCHOENMEHL AND MARTIN L. MARTUS, OF WATERBURY, CONNECTICUT, ASSIGNORS TO THE WATERBURY BATTERY COMPANY, OF WATERBURY, CONNECTICUT, A CORPORATION OF CONNECTICUT.

PRIMARY BATTERY.

1,325,115.     Specification of Letters Patent.     Patented Dec. 16, 1919.

Application filed March 16, 1917, Serial No. 155,186. Renewed October 24, 1919. Serial No. 333,057.

*To all whom it may concern:*

Be it known that we, CHARLES B. SCHOENMEHL and MARTIN L. MARTUS, citizens of the United States, and residents of Waterbury, in the county of New Haven and State of Connecticut, have invented certain new and useful Improvements in Primary Batteries, of which the following is a specification.

Our invention appertains to that class of primary battery cells wherein zinc and metal oxids are employed as the positive and negative electrodes.

The purpose of the invention is to improve upon this type of battery by producing flat shaped containers for the metal oxids to form the negative element, and by forming oval shaped zinc positive elements for surrounding such negative elements. Further to use these electrodes one within the other either in single pairs, so to speak, or in multiples or series thereof in a manner to increase the efficiency of the battery, and further to provide a single insulating support for as many of such electrodes as may be used.

Upon the accompanying two sheets of drawings forming a part of this specification similar characters of reference will be used to denote like or corresponding parts throughout the several figures and of which:

Figure 1 shows a perspective view of our improved oblong multiple form of primary battery elements, adapted to be suspended by a single hanger.

Fig. 2 shows a cross sectional elevation of a somewhat similar form of assembled element, suspended within a jar by a slightly different form of hanger.

Fig. 3 is a plan view of the assembled element shown in Fig. 2.

Fig. 4 is a central vertical cross section through the upper portion of the form of battery elements shown in Fig. 1.

Fig. 5 shows a sectional elevation of a single form of assembled battery element including our oblong shaped electrodes, and Fig. 6 is a detached plan view of the positive electrode employed in Fig. 5.

Referring in detail to the characters of reference marked upon the drawings 10 indicates an insulative supporting member including a body portion that extends crosswise over the top of the electrode and to which the hanger 11, as well as the said electrodes, are attached. The support is provided with suitable holes 12 to receive the rods for the attachment of the electrodes and the connections for the hanger and suspending rod. This support is further provided upon its top side with a central extension 15 through which the rod 13 passes. In Fig. 1 we have shown a single central suspending rod 13 that is suitably attached to the porcelain support and is provided with a nut 14 upon its upper threaded end portion. This insulative support together with the extension 15 serves to position the element distant from a battery jar cover to which it is connected.

The hanger 11, shown in Fig. 2 is attached to the top side of the porcelain and is provided with extensions 13ª to engage the top edge of the jar 16, thereby eliminating the use of a cover. This hanger as shown in Figs. 2 and 3 is secured to the porcelain support, 10 by the rods 17 and nuts 18 that serve also to attach the negative elements 19 to the support. A central supporting rod 13ᵇ is shown attached to the central bridge portion of the hanger shown in Fig. 2, thus suggesting another way of applying a single form of suspension and doing away with the extension 15, shown in Figs. 1, 4 and 5. If the assembled elements are to be supported in this by the single suspending rod 13ᵇ, shown in Fig. 2, the upwardly disposed end portions 13ª of the hanger 11 would be removed as both methods of suspending the element would not be necessary.

The negative elements 19 secured to the underside of the porcelain support contains oxids of metal 20 as their depolarizer material, which oxid may be in the form of metal scale, powder or broken pieces of compressed and baked metal oxid, contained within a perforated metal container that is relatively flat or oblong in shape. The top and bottom of these containers are preferably closed by caps 21 and 22 that are held in position by the rods 17 before mentioned and secured to the hanger 11 in Fig. 4, but which are extended, as shown, up through the holes 12 and clamped to the hanger 11 in Figs. 2 and 3. A sheet metal, tube 25 is preferably placed upon the rod within the container and is the same length as the height of the side walls of the container so that the top and bottom caps will rest upon the tube and prevent the side wall of the container from buckling when the nuts 18 upon the rods are tightened to clamp the parts together. When two sets of these electrodes are used as in Figs. 1, 2, 3 and 4 they would be spaced apart and electrically connected by means of the rods and support 11.

The positive or zinc electrodes 26 are preferably of elliptical shape and are designed to inclose the oblong negative electrode 19 so that the opposite side wall of the adjacent elements would be positioned at a uniform distance apart. These elliptical shaped positive elements may be formed single, as shown in Fig. 6, or may be shown in multiples as shown in Figs. 1 to 4 inclusive. In this latter case the intermediate wall 27 would be made thicker than the outer wall so as to provide for the increased action of the two negative elements arranged on the two sides of the central wall. The positive electrode is provided upon each side with suspending rods 29 that extend up through holes in the porcelain support and are provided with nuts 30 by means of which they are secured to said support to hold them rigid in position with reference to the inner negative electrode and the supporting member.

Assembled battery elements of this form are particularly well adapted for use in square or oblong shaped jars and make a very efficient cell since the bulk of material within the container is flattened out so as to be readily acted upon by the solution. These elements are surrounded on all sides by the zinc that is uniformly spaced therefrom.

Having thus described our invention what we claim and desire to secure by Letters Patent is:—

A battery of the class described, comprising an insulative support including a body portion having transverse engaging surface intermediate of the ends of the body, two elliptical shaped tubular positive electrodes integrally formed side by side and attached to the end portions of the body of the support, a flat form of container arranged within each of the elliptical portions of the positive element and secured to the engaging surfaces of the support, depolarizer material within the containers to form negative electrodes, and means for attaching the electrodes to the support.

Signed at Waterbury, in the county of New Haven and State of Connecticut, this 13th day of March, A. D. 1917.

CHARLES B. SCHOENMEHL.
MARTIN L. MARTUS.

Witnesses:
E. E. HUDSON,
H. T. HUBERT.